United States Patent [19]

Mäkinen

[11] Patent Number: 5,110,234
[45] Date of Patent: May 5, 1992

[54] ANGLE JOINT PIECE
[76] Inventor: Mauri Mäkinen, Kokinkyläntie 6 C2, 02180 Espoo, Finland
[21] Appl. No.: 726,774
[22] Filed: Jul. 8, 1991

Related U.S. Application Data

[63] Continuation of Ser. No. 405,341, Sep. 11, 1989, abandoned.

[30] Foreign Application Priority Data

Sep. 21, 1988 [FI] Finland .................. 884322

[51] Int. Cl.⁵ .............................. B25G 3/36
[52] U.S. Cl. ................... 403/403; 403/231; 49/409
[58] Field of Search ........... 403/401, 402, 403, 405.1, 403/231, 322; 16/105; 49/409, 410, 411

[56] References Cited

U.S. PATENT DOCUMENTS

| | | | |
|---|---|---|---|
| 2,039,125 | 4/1936 | Stuart | 403/231 |
| 3,516,215 | 6/1970 | Smith et al. | 52/656 |
| 3,912,407 | 10/1975 | Heininger | 403/231 X |
| 3,914,062 | 10/1975 | Heininger | 403/231 |
| 4,161,977 | 7/1979 | Baslow | 403/231 X |
| 4,168,922 | 9/1979 | Worrallo | 403/231 |
| 4,676,038 | 6/1987 | Doyon et al. | 403/231 X |
| 4,702,638 | 10/1987 | Zalesak | 403/403 |

FOREIGN PATENT DOCUMENTS

| | | |
|---|---|---|
| 1260107 | 2/1968 | Fed. Rep. of Germany . |
| 2059244 | 6/1972 | Fed. Rep. of Germany . |
| 2264506 | 5/1974 | Fed. Rep. of Germany . |
| 2353666 | 12/1976 | Fed. Rep. of Germany . |
| 8605912 | 8/1986 | Fed. Rep. of Germany . |
| 72574 | 2/1987 | Finland . |
| 1012869 | 7/1952 | France . |
| 82394 | 6/1971 | German Democratic Rep. . |
| WO79/00054 | 2/1979 | PCT Int'l Appl. . |
| 448483 | 2/1987 | Sweden . |
| 1069766 | 5/1967 | United Kingdom . |

Primary Examiner—Andrew V. Kundrat
Attorney, Agent, or Firm—Pravel, Gambrell, Hewitt, Kimball & Krieger

[57] ABSTRACT

An angle joint piece for the joining together of two frame battens in a sliding door that runs on rolls at an angle of 90°. The angle joint piece is fitted against the face of the frame battens that is parallel to the door plane. The face of the angle joint piece that is fitted against the frame battens is provided with at least two projections (6, 6'), which can be pressed into longitudinal grooves provided in the frame battens to be joined together.

15 Claims, 3 Drawing Sheets

ANGLE JOINT PIECE

This is a continuation of application Ser. No. 07/405,341, filed Sep. 11, 1989, and now abandoned.

BACKGROUND OF THE INVENTION

1. Field of the Invention

The present invention concerns an angle joint piece for the joining together of two frame battens in a sliding door that runs on rolls at an angle of 90°, the angle joint piece being fitted against the face of the frame battens that is parallel to the door plane.

2. Description of the Prior Art

Sliding doors which run supported by wheels mounted at their top and bottom edges along rails provided in the floor and ceiling of a room are practical and require little space, e.g., as doors of a wardrobe. The doors are usually made of frame battens and of a door panel proper. The door panels may be made of most varied materials. For example, a mirror is a commonly used material, which increases an impression of spaciousness. The frame battens are attached to each other by means of angle pieces, to which the slide wheels are also fixed. The angle pieces are made of metal plate by folding, and usually they comprise a number of different parts assembled by means of rivet joints. Various supports for slide wheels are described, e.g., in the U.S. Pat. Nos. 3,159,866 and 4,478,006.

These prior-art angle joint pieces have complicated constructions, and their assembly requires an abundance of work. Moreover, for different purposes of use different joint pieces are required, in which, e.g., the locations of the slide wheels vary.

SUMMARY OF THE INVENTION

The object of the present invention is to provide an angle joint piece for slide doors which has a simple construction and which is as such suitable for all different objects of use. The angle joint piece in accordance with the invention is characterized in that the face of the angle joint piece that is fitted against the frame battens is provided with at least two projections, which can be pressed into longitudinal grooves provided in the frame battens to be joined together.

The angle joint piece in accordance with the invention may also be provided with a joint member so that a slide wheel can be attached to any one of its sides. This means that the same angle joint piece can be used both at the right side and at the left side of the door and likewise both at the top edge and at the bottom edge. It is very easy to attach the frame battens to the angle joint piece in accordance with the invention, because the projections on the angle joint pieces always align the frame battens exactly and correctly. According to a preferred embodiment of the invention, the projections are ridges perpendicular to each other and parallel to the plane of the door, or lines of pins consisting of two or more pin-like projections, and the distance of the first ridge or line of pins from the extension of the second ridge or line of pins is at least equal to the distance of the groove in the frame batten from the inner edge of the frame batten. In such a case, if necessary, the frame battens can be cut off at an angle of 90°, either one of said battens being fitted against the door edge at the end edge. It is also equally well possible to use frame battens cut off at an angle of 135°. The angle joint piece in accordance with the invention is most appropriately manufactured by casting as one piece, in which case it does not require any assembly work but is as such ready for fixing to the edge battens of a door. A suitable raw-material is plastic, e.g. polyamide, whose cost is favourable. Such an angle joint piece is of remarkably low weight in comparison to earlier corresponding members made by folding out of metal plate.

When angle joint pieces in accordance with the invention are used, the thickness of the frame batten can be chosen freely, so also its width.

BRIEF DESCRIPTION OF THE DRAWINGS

The invention will be described in more detail in the following with reference to the accompanying drawings, wherein.

DESCRIPTION OF PREFERRED EMBODIMENT

The frame of the angle joint piece in accordance with the invention is a plate-shaped part 1. Two sides 2 and 3 of the angle joint piece are supposed to be fitted to the corner of the door. On the face of the angle joint piece that is placed facing outwards from the door there are two projections 4 in which there are oblong cavities 5, 5' placed perpendicularly to the sides 2 and 3 of the joint piece that are parallel to the edges of the door. Both ends of the cavities 5, 5' are open, and they are provided with internal threadings.

Figure 1:
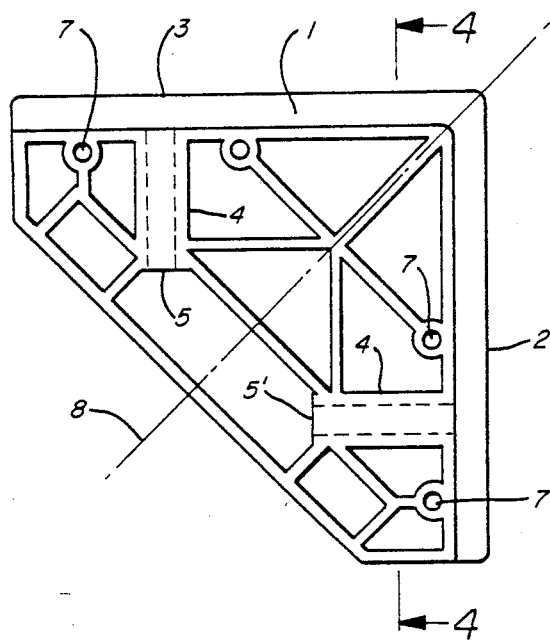
FIG. 1 shows the face of an angle joint piece in accordance with the invention that is placed facing outwards from the door.
Figure 2:
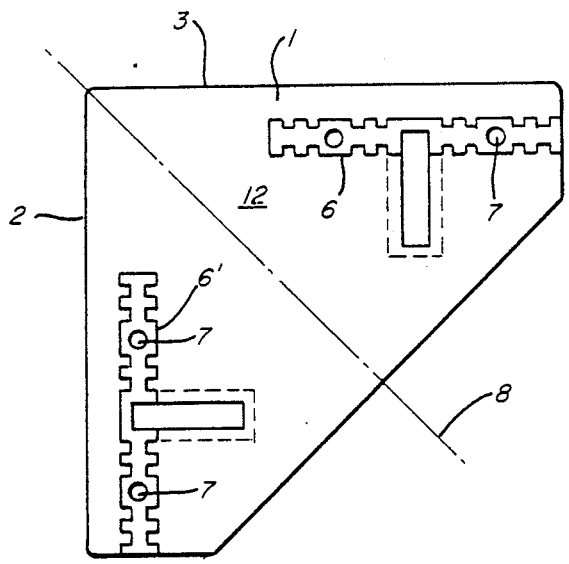
FIG. 2 shows the face of the same joint piece that is placed facing towards the door.
Figure 2A:
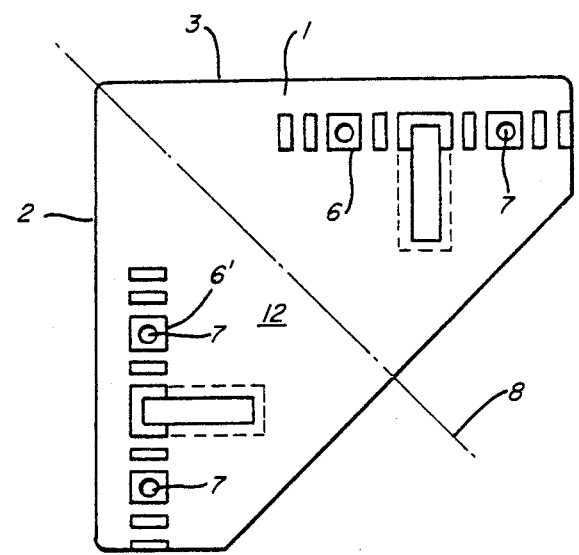
FIG. 2A shows the face of an alternate joint piece to that of FIG. 2.
Figure 3:
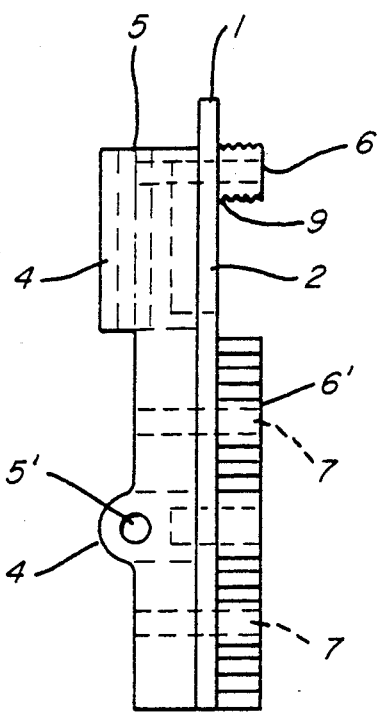
FIG. 3 shows the joint piece of FIG. 2 as a side view.
Figure 4:
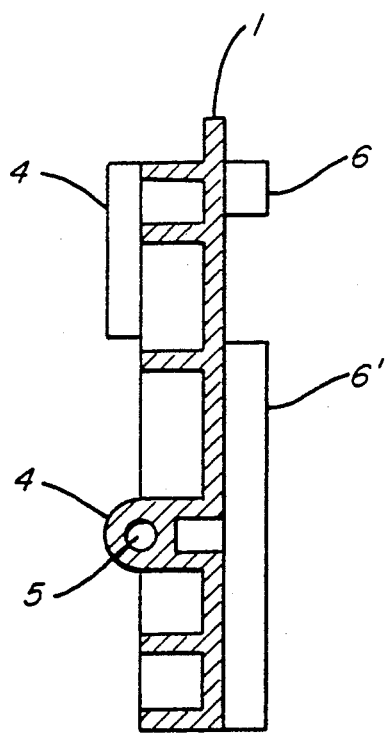
FIG. 4 is a sectional view taken along the line A—A in FIG. 1.

On the face 12 of the joint piece that is to be fitted towards the door there are two oblong projections 6, 6' parallel to the sides 2 and 3. Additionally, each of the projections has, e.g., two holes 7 passing through the plate part 1. If necessary, on the longitudinal sides of the projections it is possible to dispose ridges 9 (FIG. 3) parallel to the projections, said ridges 9 projecting from the sides of the projections 6, 6' and being supposed to be pressed resiliently against the side walls of the grooves 11 (FIG. 5) frame battens 10, thus keeping the projection tightly in its position in the groove in the direction of depth. It is also possible to use scale-like ridges which prevent longitudinal movements of the batten.

The frame battens that surround the panel part of a door are attached to the angle joint piece in accordance with the invention at an angle of 90° relative one another by pressing the projections 6, 6' (FIG. 5) into the longitudinal grooves 11 provided in the frame battens 10. The ends 10a of the battens 10 may be cut off at an angle of 90° or 135°. Depending on the material of the battens 10 and on the dimensioning of the grooves 11, the friction between the projections 6, 6' and the grooves 11 in the battens 10 may be sufficient to keep the battens 10 in their position. For example, wooden battens are to such an extent elastic that they remain in their positions even without screws. If necessary, e.g., the joints of metallic battens can be ensured by means of screws passing through the holes 7, which said screws are pushed through the frame batten and secured by means of nuts. Nuts may also be omitted, in particular if a screw is used whose diameter is such that, when threaded into the joint piece, it expands the hole 7 and, at the same time, the ridge 6. In this way the holding of the ridge in the groove is ensured.

The support of the slide wheels, e.g. a threaded bolt (not shown in the drawings) is attached to the cavity 5 placed vertically in the angle piece. At one end of the bolt there is a horizontal shaft of the slide wheel, placed perpendicularly to the plane of the door. Slide wheels may be used either at both ends of the shaft or at one end only, depending on the slide rail used. To the upper end of the bolt, it is also possible to attach a horizontal support parallel to the plane of the door, slide-wheel shafts parallel to the plane of the door being fitted at both ends of said support and two wheels being mounted on each shaft. Thus, a set of slide wheels may comprise one, two or four wheels. The slide wheels run on horizontal support faces of rails mounted above and below the door. The vertical position of the slide wheels can be adjusted by rotating the bolt in the cavity 5.

Depending on the support system that is used, it is also possible to attach a vertical shaft of a slide wheel to one end of the bolt. In such a case, properly speaking, the slide wheel does not support the door, but rather acts as a guide wheel and runs against a vertical guide face of the guide rail. When such a guide wheel is placed at the top edge of a door, the weight of the door rests on the wheels placed at the bottom of the door. Instead of guide wheels at the top edge of a door, it is also possible to use guide pieces provided with brushes and moving along guide faces. As an alternative, the guide wheels or brushes may be placed at the bottom edge of a door, in which case the door is supported on the wheels placed at the top edge.

Since the joint piece is symmetric relative to the bisector 8 between its sides 2 and 3, it may, if necessary, be turned by 90° in its plane, in which case the same piece is suitable both for the right corner and for the left corner of the door. When the piece is turned by 180° in its plane, it can be used at the bottom edge of a door.

Figure 5:
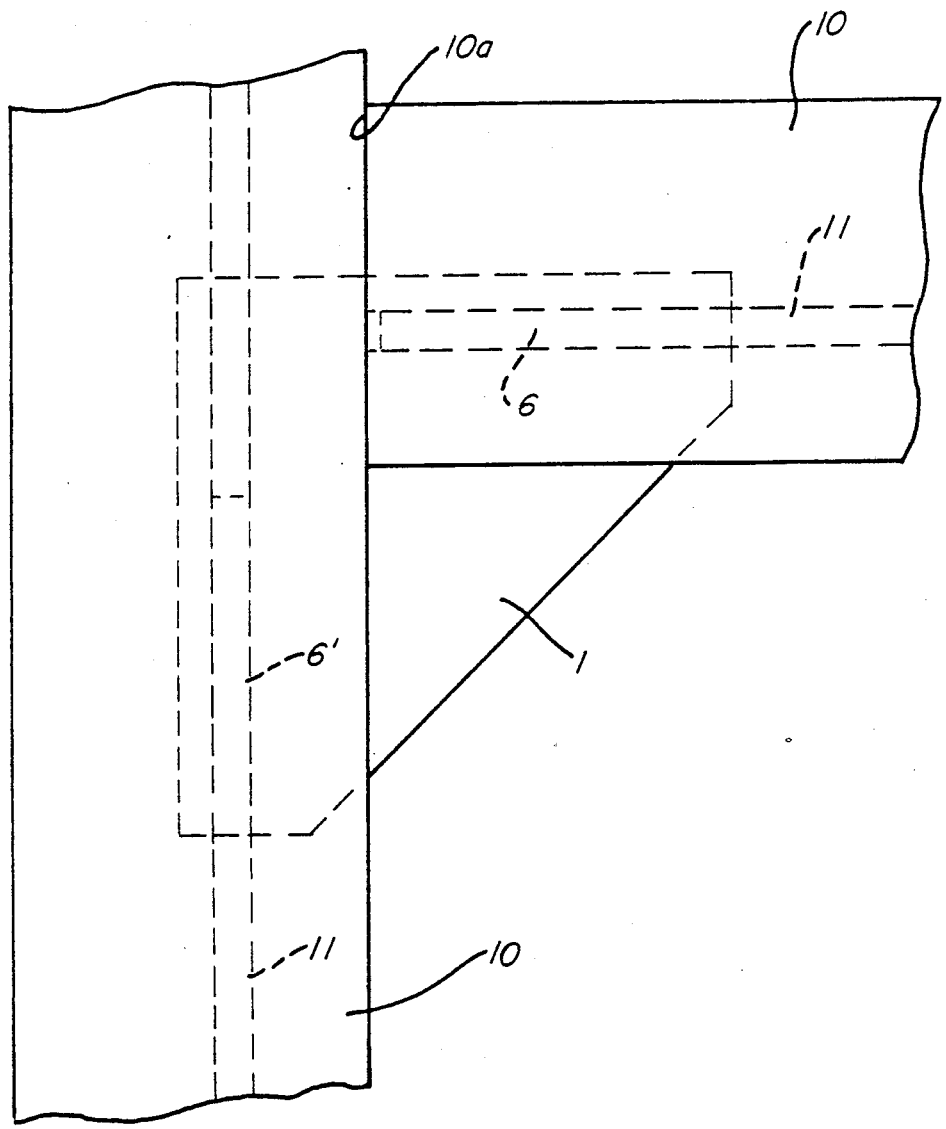
FIG. 5 is a schematical illustration of one mode of connecting the frame battens to an angle joint piece.

As the guiding projections leave the corner portion of the angle joint free, one of the frame battens 10 may extend even beyond the angle joint piece. Thus, the frame battens 10 may be assembled in H-form and, if desired, the upper panel of the door may be made of a different material, e.g. of glass. Such a solution is illustrated in FIG. 5. The projections 6 and 6' are fitted in the grooves 11 in the frame battens 10.

The invention is not confined to the above embodiment alone, but it may show variation in different ways. For example, the oblong ridge-shaped projections 6, 6' may be substituted for by two or more pin-like projections placed one after the other, to be pushed into the groove in the batten. By means of ridge-shaped projections, the friction face, however, becomes larger so that the joint is more reliable.

If necessary, the horizontal cavities 5, 5' in two opposite joint pieces may be utilized by fitting between them an extra bond bar, which makes the door more stronger. If necessary, it is also possible to attach a limiter rod to a horizontal cavity, which limiter rod, When it meets an obstacle in a wall, restricts the lateral movement of the door to the desired extreme point.

The shape and width of the frame battens can be chosen freely. If necessary, it is possible to use a batten which extends to above the slide wheels at the top edge of the door and covers the wheels behind the batten. In such a case, no separate covering batten is required, which was necessary in the prior-art solutions.

The joint piece in accordance with the invention may also be attached to existing doors, whereby such doors can be readily converted to sliding doors.

When a slide-wheel support is not attached to the cavities 5, 5' the angle piece in accordance with the invention may also be used as an angle joint for other purposes, for example as a frame for a painting.

In the prior-art frame battens a U-shaped groove placed at the side of the batten has been used, into which the door panel has been fitted. When the joint piece in accordance with the present invention is used, the door panel may also be fitted between the frame batten and the plate part of the joint piece, in which case the edge of the panel rests against the edge of the projection 6 and the frame batten is attached to the joint piece by means of screws.

If necessary, in the angle joint piece, it is possible to employ various projecting rigidifying ribs, on one hand, and weight-reducing recesses, on the other hand.

The angle joint piece in accordance with the invention can also be mounted on folding doors in which, when the door panels are pushed to the side, the panels are folded to V-shape. The bolt that supports the slide wheel and that is attached to the joint piece can turn and permits pivoting of the joint piece in relation to the guide rail.

What is claimed is:

1. A frame structure for a slide door carried by wheels, which frame structure comprises frame battens (10) joined to each other at an angle of 90° by means of one of a plurality of angle joint pieces (1), so that each angle joint piece (1) is fitted against a face of frame battens that is parallel to a plane of the door, and a face (12) of each said plurality of angle joint pieces which is fitted against said frame battens is provided with two projections (6, 6'), said projections being perpendicular to one another and parallel to said plane of the door, said projections being fitted into longitudinal grooves (11) provided in said frame battens (10), the longitudinal grooves in the battens being open toward said plane of the door, characterized in that:
   the distance of a first of said projections (6) from an extension of a second of said projections (6') is at least equal to the distance of a first of said longitudinal grooves (11) in said frame battens from an inner edge (10a) of said frame battens (10), and that said frame battens are cut off at an angle of 90°.

2. The frame structure as claimed in claim 1, characterized in that the projections (6,6') are interconnected by means of a plate part (1).

3. The frame structure as claimed in claim 1, characterized in that an opening (7) perpendicular to the plane of the door passes through the projection, into which opening (7) a fastening member can be fitted.

4. The frame structure as claimed in claim 3, characterized in that the diameter of the opening (7) is dimensioned so that the fastening member to be fitted into it expands the projection.

5. The frame structure as claimed in claim 1, characterized in that the angle joint piece is provided with two joint members (5,5'), into each of which a support of a slide wheel can be fitted, the joint members being placed in such a way that a slide-wheel support fitted into a first joint member (5) supports a slide wheel running in the direction of the first frame batten and a second joint member (5') is fitted perpendicularly to said first joint member.

6. The frame structure as claimed in claim 5, characterized in that the joint members includes at least one oblong cavity (5, or 5') opening perpendicularly towards one side (2, 3) of the angle joint piece, into which cavity the support of the slide wheel can be fitted.

7. The frame structure as claimed in claim 6, characterized in that said at least one cavity (5, 5') is open at both of its ends.

8. The frame structure as claimed in claim 1, characterized in that the joint piece is symmetric relative to a bisector (8) of the angle between its sides.

9. The frame structure as claimed in claim 1, characterized in that the joint piece is cast as one piece.

10. A frame structure according to claim 1, characterized in that the door has more than one panel.

11. A frame structure according to claim 10, characterized in that the frame battens are assembled in H-form.

12. A frame structure according to claim 1, wherein said two projections each comprise continuous elongate ridges.

13. A frame structure according to claim 1, wherein said two projections each comprise a line of a plurality of pin-like projections.

14. A frame structure according to claim 13, wherein said lines of pin-like projections are perpendicular to one another.

15. A frame structure according to claim 1, wherein said two projections (6, 6') project outwardly from said face (12) of said angle joint piece.

* * * * *